Jan. 7, 1964  S. LOMBARDO  3,116,653
ADJUSTABLE TOOL-HOLDER
Filed Sept. 18, 1961  2 Sheets-Sheet 1

Jan. 7, 1964   S. LOMBARDO   3,116,653
ADJUSTABLE TOOL-HOLDER
Filed Sept. 18, 1961   2 Sheets-Sheet 2
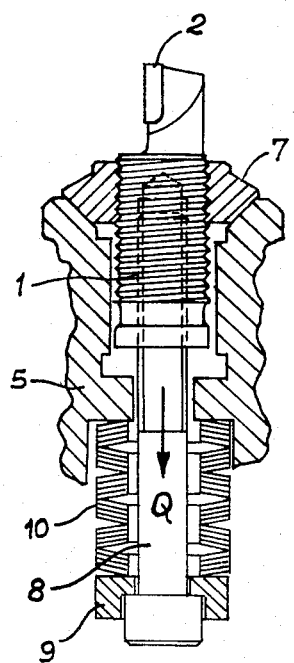
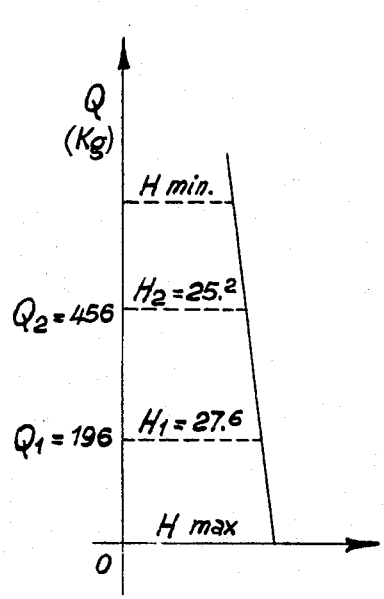

United States Patent Office 3,116,653
Patented Jan. 7, 1964

3,116,653
ADJUSTABLE TOOL-HOLDER
Salvatore Lombardo, Milan, Italy, assignor to Innocenti Soc. Gen. per l'Industria Metallurgica e Meccanica, Milan, Italy
Filed Sept. 18, 1961, Ser. No. 139,570
Claims priority, application Italy Sept. 27, 1960
1 Claim. (Cl. 77—58)

This invention relates to improvements in tool-holding devices.

The present invention has the object of producing a micrometrically adjustable tool-holding device which is particularly adapted to carrying out finishing and high precision work.

Another object of the invention is to produce a micrometrically adjustable tool-holding device comprising not only an adjustment by reduced amplitude but also rapid adjustments by amplitudes greater than those of the usual field of micrometric adjustment in order to reduce the number of boring heads required for covering the entire range of diameters and to reduce the work to be done.

Another object of the invention is to produce a casing which can be easily and quickly put into position in relation to its seating.

Another object of the invention is to produce a device in which the micrometric adjustment of the tool can be achieved by a simple rotation without this rotation requiring excessive effort.

Other objects and advantages of the invention will be revealed by the following description and attached drawings, given by way of non-restrictive examples, in which:

FIGURE 3 is a diagrammatic view showing how the device behaves;

FIGURE 4 is a diagram referring to the micrometric adjustment of the tool.

Figure 1:
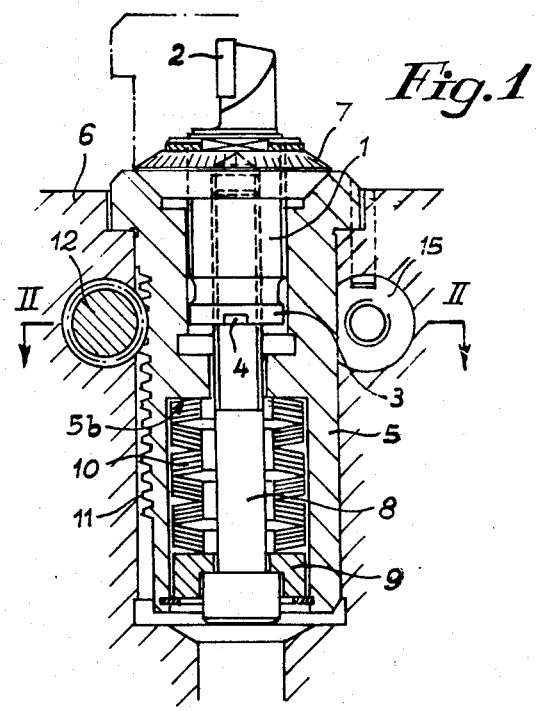
FIGURE 1 is a sectional view of the device according to the invention.
Figure 2:
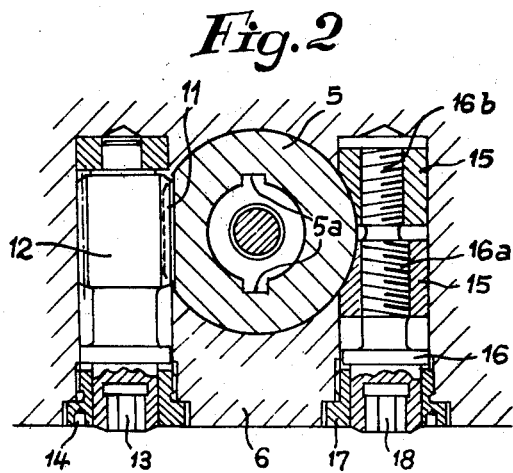
FIGURE 2 is a sectional view taken along the line II—II of FIGURE 1.

Devices of known types are capable of a single micrometric adjustment of limited amplitude, the adjustment being obtained by means of a graduated ring after loosening a locking screw. In actual practice, this calls for the use of a large number of boring heads in order to be able to carry out work covering the entire range of diameters. Furthermore, the replacing of the boring head for work corresponding to different diameters means an appreciable loss of time.

On the other hand, the instrument according to the invention is capable of three adjustments:

(a) a reduced amplitude micrometric adjustment, of 2.4 mm., for example, obtainable by rotating the graduated ring without loosening the locking screw of the body of the tool in relation to the casing, said adjustment taking place by the deformation of interposed spring means.

(b) a supplementary adjustment in amplitude of about 13 mm. obtainable by displacing the body of the device in relation to the casing, after loosening the locking screw and corresponding displacement of the graduated ring.

(c) a coarse adjustment of an amplitude of about 35 mm. obtainable by displacing the casing in relation to its housing.

In the attached drawings, the reference numeral 1 denotes the body of the tool-holder device formed of a small cylindrical block provided with a micrometric threading externally and frontally and integrally carrying the tool 2. The body 1 of the device terminates in a smooth hind appendix 3 provided with two opposed projections 4, 4. The body of the device is contained in a fore cylindrical housing of a casing 5 also of cylindrical shape, said casing sliding without the possibility of turning in a corresponding seat of the support 6 formed, in the present case, by the boring head.

The fore cylindrical housing of the casing 5 comprises two opposed grooves 5a along which the projections 4 of the body of the device can slide, which prevents the body 1 from rotating.

A ring 7 engages on the threads of the body 1, said ring bearing by a tapered surface on a fore surface of corresponding shape to that of the casing 5. This ring is provided with a graduated scale, to be seen in FIGURE 1, each graduation of the scale corresponding to a displacement of one-hundredth of a millimeter of the tool. This graduated scale cooperates with a fixed index mark on the casing 5.

The body of the device is locked on the casing 5 by a hind screw 8 threaded into a blind hole in the body 1. The head of this screw maintains, by means of a washer 9, an assembly of springs 10 contained in a hind compartment of the casing. Finally, the locking of the body 1 takes place by means of the screw 8 through the spring assembly 10 acting between the head of the screw and a shoulder 5b of the casing.

The spring assembly 10 forms a resilient means ensuring the locking of the body of the device in a desired position by permitting micrometric adjustment by the rotation of the graduated ring 7, without requiring the loosening of the screw 8.

For this purpose, the spring assembly 10 is compressed beforehand so as to produce a load Q sufficient for ensuring the holding of the tool in its seat by reacting to the cutting stress P applied to the tool during working.

According to the form of embodiment of the device shown in the drawings, this load has the minimum permissible value of $Q_1 = 196$ kgs., when the spring assembly has a total height $H1 = 27.6$ mm. (see the diagram of FIGURE 4).

Micrometric adjustment of the tool can be obtained by revolving the graduated ring 7 without excessive stress, by compressing the spring assembly 10 until the height is reduced to a value $H2 = 25.2$ mm., effecting, in this position, a load $Q_2$ of 456 kgs. The micrometric adjustment then has an amplitude of 2.4 mm. in the case shown.

The supplementary adjustment of the tool is made by loosening the locking screw 8 and then displacing the ring 7 in relation to the body 1 of the device so as to modify the relative position between the body 1 and the casing 5. This adjustment has an amplitude of about 13 mm. The cylindrical casing 5 is provided with rack teeth 11. A transversely positioned toothed pinion 12 meshes with rack 11. This pinion is placed in a cavity in the boring head 6.

The toothed pinion 12 is provided with a frontal socket 13 enabling the rotation to be controlled by means of an internal socket wrench. The pinion 12 is kept in place by a ring 14 screwed into the boring head 6.

In a position symmetrical to the pinion 12 in relation to the axis of the casing 5 are two opposite cylindrical wedges 15 placed in a corresponding cavity communicating with and transverse to the seat in the boring head 6. Said cylnidrical wedges each have a cylindrical beveled profile and are provided internally with axial threaded holes in which a screw 16 engages comprising two sections 16a and 16b threaded in the opposite direction; these sections engaging with the corresponding threads in the wedges for the purpose of moving the wedges into clamping engagement with the casing 5.

The screw 16 is kept in its housing by a threaded ring 17 and is provided with a frontal socket 18 enabling rotation to be controlled.

To make a coarse adjustment of the tool so as to put it in an approximate position, the cylindrical wedges 15 are loosened while revolving the screw 16, thus unlocking the casing 5 in its seat in support 6. The toothed wheel is then revolved in the required direction, so as to drive the casing 5 axially inwardly or outwardly with respect to the boring head 6.

The amplitude of this possible coarse adjustment in this manner is about 35 mm. The wedges 15 are then again locked, the adjustment made, so as to hold the casing 5 in a stable manner in the position where it has been placed.

All the adjustments described above can be accomplished in a relatively rapid manner, so that the device is advantageous in actual practice by comparison with analogous ones of known type.

It is quite obvious that the invention is not restricted to the example of embodiment described and shown above, and from which other forms and other methods of embodiment could be provided without going outside of the scope of the invention for that purpose.

What I claim is:

An adjustable tool-holding device particularly for boring heads comprising: a cylindrical casing having an axial bore therein, means in the boring head defining a cylindrical seat adapted to slidably receive the cylindrical casing, a peripherally threaded cylindrical body means mounting the body for axial sliding movement within said bore of the casing, said body having a tool fixed at one end and a threaded bore at opposite end thereof, a graduated adjustment ring threadedly attached to the body and abutting on the casing, a screw having its tip screwed into the threaded bore of said body and having its head carrying shank extending through the bore of the casing and the screw head, prestressed spring means between the screw and the casing biasing the body against the casing, and means in said boring head adjacent the seat for coarsely axially displacing and locking the casing in said seat, said last mentioned means comprising a rack fast with the casing externally disposed along a generatrix thereof, an externally operated toothed pinion supported in the boring head and meshing with said rack, a pair of opposed cylindrical wedges slidably mounted in a housing communicating with and transversely disposed of said cylindrical seat in the boring head, each wedge having on one side thereof a cylindrically beveled profile movable into clamping engagement with said casing, and an externally operated screw rotatably supported in the head and having oppositely banded threaded portions each engaging one of said wedges.

References Cited in the file of this patent

UNITED STATES PATENTS

| | | |
|---|---|---|
| 1,893,810 | Travis | Jan. 10, 1933 |
| 2,353,079 | Rice | July 4, 1944 |
| 2,652,634 | De Vlieg | Sept. 22, 1953 |

FOREIGN PATENTS

| | | |
|---|---|---|
| 86,974 | Sweden | July 28, 1936 |
| 1,191,132 | France | Apr. 6, 1959 |
| 1,212,242 | France | Mar. 22, 1960 |
| 1,079,422 | Germany | Apr. 7, 1960 |